R. O. PICKIN.
SPRING NUT.
APPLICATION FILED MAY 25, 1914.
1,291,114.
Patented Jan. 14, 1919.
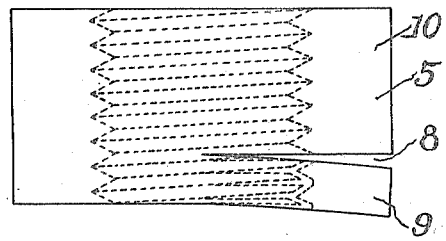
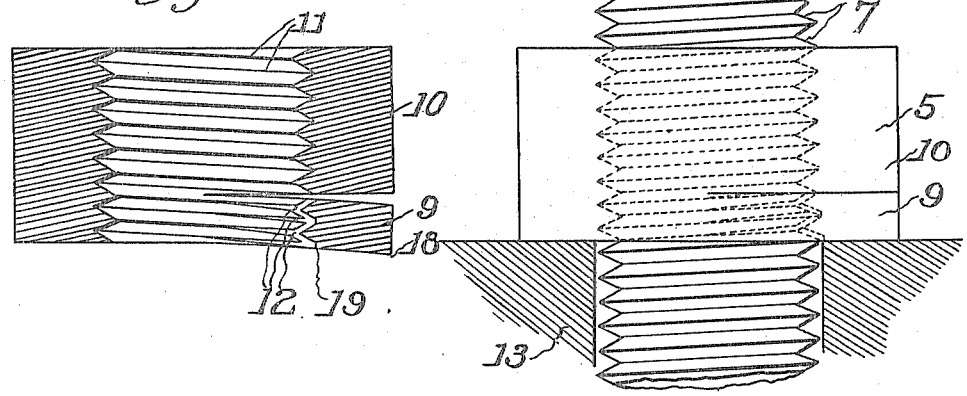
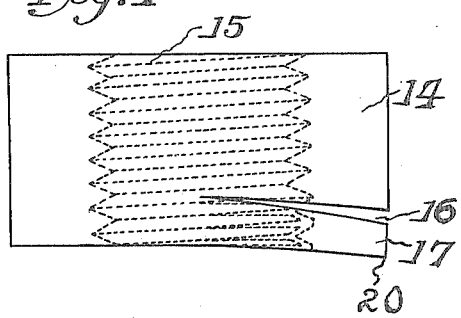
Witnesses:
JCCarpenter
Esther Abrams.
Inventor:
Rowland O. Pickin
Munday Evarts Adcock & Clarke
By
Attys.

UNITED STATES PATENT OFFICE.

ROWLAND O. PICKIN, OF CHICAGO, ILLINOIS.

SPRING-NUT.

1,291,114.   Specification of Letters Patent.   Patented Jan. 14, 1919.

Application filed May 25, 1914. Serial No. 840,678.

*To all whom it may concern:*

Be it known that I, ROWLAND O. PICKIN, a citizen of the United States, residing in Chicago, in the county of Cook and State of Illinois, have invented a new and useful Improvements in Spring-Nuts, of which the following is a specification.

My invention relates to improvements in spring nuts and has for its object broadly the provision of a one-piece nut which may be secured on a threaded member or part of any rapidly vibrating machine, device or mechanism, said nut being so constructed that it, when turned down firmly against a stationary part, will operate as a self-locking nut, securing itself in place against becoming loosened by the vibration of the machine, device or mechanism.

A principal object of the invention is the provision of a spring nut of the character described which may be positioned without danger of stripping or distorting any of the threads with which the nut is provided or any of the threads upon the part to which it is secured.

A further object of the invention is the provision of a spring nut composed of a single member which may be positioned by merely turning it into position upon the threads of the part to which it is to be secured, and which may be as readily removed as occasion may require.

A still further object of the invention is the provision of a spring nut which may be constructed from an ordinary nut with slight alteration and almost inappreciable diminution in strength.

An additional object of the invention is the provision of a spring nut of the character described which will be cheap to manufacture and durable and efficient in operation.

Other objects and advantages of the invention will be apparent as it is better understood from the following description when considered in connection with the accompanying drawing, illustrating various embodiments of my invention.

On the drawing,

Figure 1 is a side elevation of a spring nut embodying my invention positioned upon the end of a threaded shaft;

Fig. 2 is a similar view of the nut detached;

Fig. 3 is a longitudinal sectional view taken on the axis of the nut shown in Figs. 1 and 2; and Fig. 4 is a view similar to Fig. 1 showing a second embodiment of my invention.

Referring to the drawings, reference character 5 designates generally a spring nut embodying my invention, reference character 6 the end of a shaft or other machine element upon which is provided a plurality of threads 7 of the ordinary form. The spring nut 5 is slit transversely at 8 to approximately the central axis and the portion 9 at one side of this slit is bent or otherwise deflected from the portion 10 at the other side, preferably in the form of a curve as seen in Figs. 2 and 3. The nut 5 is provided internally with threads 11 of an appropriate pitch and size to engage the threads 7. The threads, however in the portion 9 are cut away at the side deflected at 12 for a purpose which will hereinafter appear.

The deflected portion 9 forms a yielding abutment which, when the nut is turned down, as shown in Fig. 1, against a hub, shoulder or other member 13, moves up into contact with the portion 10, forcing the portion 10 up on the right-hand side and firmly locking the threads of the two portions 10 and 9 in strong and fixed frictional engagement with the threads 7 of the part 6. The threads are cut away at 12 to permit the abutment or portion 9 to move up in the position shown in this figure without shearing off the threads in the nut or on the shaft.

In Fig. 4 a somewhat modified form of nut 14 embodying my invention is disclosed, in which the slit, as will be noted, is not disposed in a plane at right angles to the axis of the nut but is inclined from above the lower face of the nut to the center. The portion 17 beneath the slit 16 in this figure is deflected, as is the portion 9, and acts in substantially the same manner. In either embodiment the upward movement of the portion 9 or 17, as the nut is turned home, forms a strong engagement with the threads upon the end 6 of the shaft and materially increases the frictional engagement between the nut and shaft when in locking position.

It will be apparent that the first engagement with the portion 9 or 17 and the shoulder, collar or hub 13 occurs at the outermost point 18 or 20 of the portion 9 or 17, respectively, and in bending the portion 9 or 17 back into the position shown in Fig. 1 it acts as a lever fulcrum at the inner end of the slit and having an operating arm equal to the distance of this inner end from the outer face of the portion 9 or 17 and a lifting or working arm equal to the distance from the inner end of the slit to the point of engagement between the threads.

My invention concerns itself also with the making of the nut already described, and the process employed is preferably as follows:

The nut is drop-forged, stamped or formed in any preferred or well known manner, the slit 8 is then provided, care being taken, however, to remove as little as possible of the material of the nut in this step of its manufacture, the best results being obtained, it is believed, when no material at all is removed. The nut is next threaded in the ordinary way. The portion 9 is then deflected or turned downwardly, the threading tool being preferably run back and forth through the nut at the same time to cut away the portions 12. However, if sufficient material be removed in cutting away these portions it will only be necessary to run the threading tool through before and after the portion 9 is deflected. The steps in the process just described may be varied in order, however, without departing from the spirit of the invention.

It will be apparent from the foregoing that an ordinary nut may be converted into a spring nut embodying my invention by merely slitting it and providing the cut-out portions 12. This does not materially weaken the nut and endows it with all of the advantages of a spring nut made in pursuance of my invention.

It will be obvious that various changes may be made in the form, construction and arrangement of the nut and of the slit and slitted threads, and of the method or process of making the nut without departing from the spirit and scope of the invention, the form hereinbefore described being merely a preferred embodiment thereof.

I claim:

1. A spring-nut comprising a nut threaded internally and slit transversely, a portion at one side of the slit being deflected and the threads in said portion being cut before and after said portion is deflected.

2. A spring-nut comprising a nut threaded internally and slit transversely a portion at one side of said slit, being deflected from the other portion, the threads within said deflected portion being partly removed where they would interfere with the threads on a part to which the spring-nut is adapted to be secured.

Signed and dated this 21st day of May, 1914, in the presence of two subscribing witnesses.

ROWLAND O. PICKIN.

Witnesses:
J. C. CARPENTER,
H. M. MUNDAY.